No. 641,903. Patented Jan. 23, 1900.
C. P. STEINMETZ.
SYSTEM OF ELECTRICAL DISTRIBUTION.
(Application filed Sept. 30, 1899.)
(No Model.)
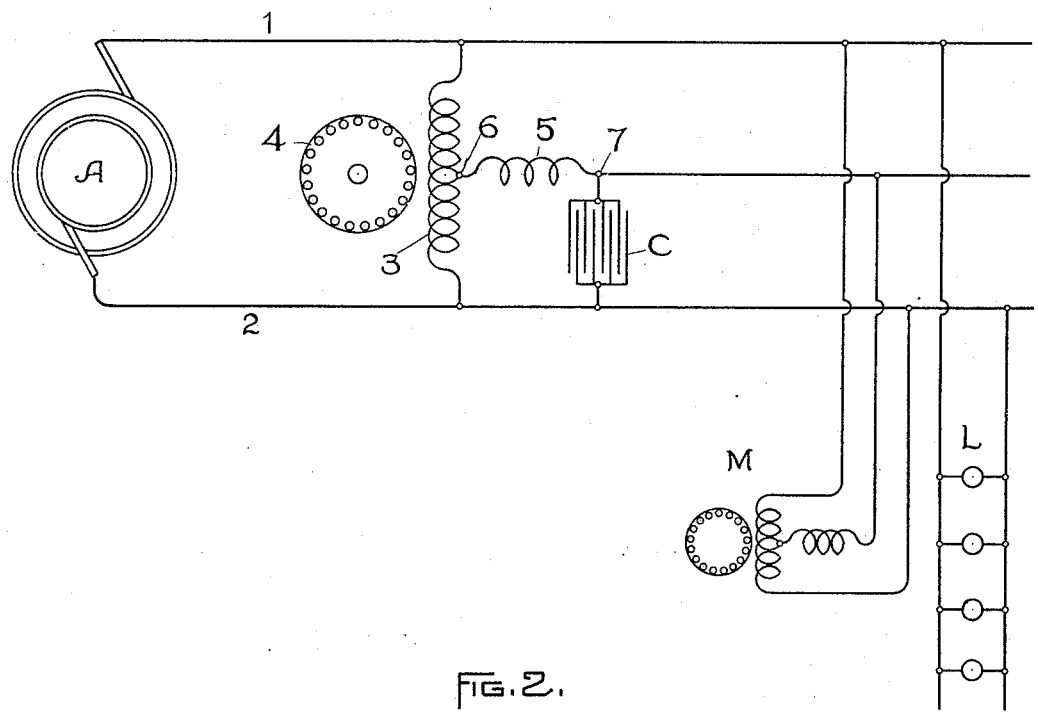
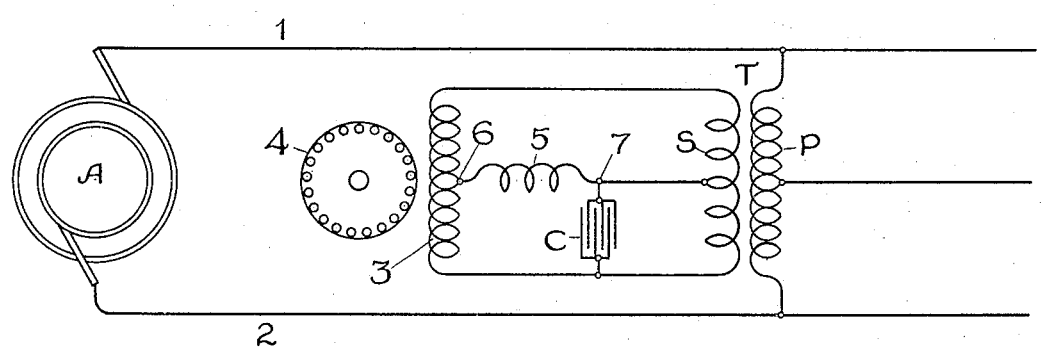
WITNESSES.
A. H. Abell.
A. F. Macdonald.
INVENTOR.
Charles P. Steinmetz,
by Albert G. Davis
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 641,903, dated January 23, 1900.

Application filed September 30, 1899. Serial No. 732,154. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 961,) of which the following is a specification.

In existing single-phase systems it is frequently desired to supply a motor-load without at the same time increasing the capacity of the station by adding multiphase generators or the like. In such cases it is advantageous to transform the single-phase current to monocyclic. Such transformation is also desirable in cases where a system of lighting with incidental motors is to be operated at a considerable distance from the generating-station, from which it is inconvenient to run a third wire for supplying the motor. The transformation from single phase to monocyclic may be secured by the use of rotary induction devices. Such a device consists, essentially, of an induction-motor or, more correctly speaking, an induction-machine having a short-circuited low-resistance armature—as, for instance, of the squirrel-cage type—and provided with two primary windings on the inducing member. The first winding is connected to the single-phase mains either directly or through transformers, while the second winding is connected with one end of the middle of the first winding and its free end to the teaser-circuit of the system either directly or through transformers. Such a monocyclic-phase transformer is, however, not self-starting and when running consumes wattless magnetizing-current. My invention aims to overcome these disadvantages; and it consists of suitable means for starting the phase-transformer from the single-phase mains and for compensating for the wattless magnetizing-current when running. In the particular embodiment which I have chosen to illustrate my invention I employ for this purpose a condenser which is connected between the teaser-terminal and one of the main terminals of the phase-transformer.

The details of my invention and its mode of operation will be better understood by reference to the following description, taken in connection with the accompanying drawings, while its scope will be pointed out in the claims appended hereto.

In the drawings, Figure 1 illustrates a monocyclic-phase transformer connected directly to single-phase mains, and Fig. 2 shows a monocyclic-phase transformer inductively connected to single-phase mains.

Referring to Fig. 1, A represents diagrammatically any source of single-phase current—such, for example, as a single-phase generator or a single-phase generating-station. Single-phase mains 1 and 2 lead from the source A of single-phase current and at some selected point in their length are connected to the main winding 3 of a monocyclic-phase-transforming device. This phase-tranforming device may be located in the same station with the generating source of single-phase current, or it may be placed within some outlying district fed with current from the source, the particular relation as to distance being unimportant. The primary winding 3 corresponds to the inducing-winding of a single-phase motor and, as in the case of a single-phase motor, acts upon a short-circuited induced member or armature 4, shown in this case as of the squirrel-cage type, although it will be evident that any other suitable form of induced member may be employed, if desired. Unlike the single-phase motor, however, the primary or inducing member of the phase-transforming device is provided with an additional winding 5, angularly displaced with respect to the main winding 3, with one of its ends connected at 6 to an intermediate point in the length of the winding 3, while its other end 7 is connected to an additional main, known as the "teaser-wire." This winding 5, which I may call the "teaser-winding," is preferably constructed with one-quarter the number of turns, but four times the cross-section of the main winding 3, and is connected to the middle point in the main winding. When the phase-transformer is running light, it operates as a single-phase motor, while when current is consumed in the teaser-circuit the phase-transformer generates current in the teaser-winding displaced in phase from that in the main winding, thereby consuming current from the main generator or source of supply in the main winding, the latter current being equal to approximately one-quarter of the current generated in the teaser-circuit.

If no motors are operating on the teaser-circuit, the phase-transformer can receive nothing but a single-phase current from the mains and is therefore not self-starting. I overcome this difficulty by connecting a condenser C between the teaser-circuit 7 and one of the single-phase mains. When starting, this condenser is acted upon from the main circuit 3 and carries a leading current, which, combined with the main current, gives sufficient torque for purposes of starting, while when the phase-transformer is running it compensates for the magnetizing-current supplied thereto. When at rest, no electromotive force is induced in the teaser-winding, since it is not in mutual inductive relation to the main winding. The operation of the main winding in feeding the condenser is therefore similar to that of a compensator or autoconverter. The condenser-current passes through the teaser-winding and being out of phase with the currents in the main winding produces a rotary field and causes the machine to start. As soon, however, as the machine starts a new action takes place. The polar line, due to the currents induced in the armature by current in the main winding, is shifted, by reason of the rotation of the armature, so as to be in partial inductive relation to the teaser-winding, thereby causing an out-of-phase electromotive force to be induced in the teaser-winding. This electromotive force is impressed on the consumption-circuit and on the condenser. The reaction of the condenser causes a leading current to flow, which, combined with the lagging current in the teaser-winding, causes an advance in phase of the current in the latter winding. This effect is reflected back inductively through the armature to the main winding, thus reducing the amount of lagging current in the machine. The action is similar to that of a condenser in the secondary of a transformer.

Fig. 1 shows lamp L or other single-phase-translating devices connected to the single-phase mains 1 and 2, while motors of the monocyclic type M are shown as connected both to the single-phase mains 1 and 2 and to the teaser-circuit 7. The mode of operation of these motors is so well known in the art as not to require description.

Fig. 2 illustrates substantially the same arrangement of circuits as in Fig. 1, but with the exception that the phase-transformer is connected to the single-phase mains 1 and 2 inductively through a transformer T, which in this case is shown as provided with a primary winding P and a secondary S. The teaser-circuit is connected to the middle point in the primary winding of the transformer T, while the teaser-winding 5 of the phase-transformer is in a similar manner connected to the middle point of the secondary winding S. The terminals of the secondary winding are connected to terminals of a main winding 3 of the phase-transformer, the other connections of the phase-transformer, including the connection of the condenser, being the same as those shown in Fig. 1. In operation a single-phase electromotive force is impressed upon the main winding 3 of the phase-transformer, which after having been started sets up an out-of-phase electromotive force in the winding 5, which is reflected back through the secondary of the transformer T to the primary, thereby maintaining upon the teaser-circuit 7 the desired out-of-phase electromotive force necessary for starting and operating induction-motors.

It will of course be understood that while I have shown lamps and monocyclic motors as the only loads upon the single-phase system illustrated any other forms of translating devices adapted to this mode of supply may be employed.

What I claim as new, and desire to secure by Letters Patent of the United States, is—

1. A system of distribution comprising single-phase mains, a rotary phase-transforming device connected across said mains, a teaser-wire leading from said phase-transforming device and coöperating with said single-phase mains, and means for compensating for the wattless magnetizing-current consumed by the phase-transforming device.

2. A system of distribution, comprising single-phase mains, a rotary phase-transforming device connected across said mains, a teaser-wire leading from said phase-transforming device, and a condenser connected between the teaser-wire and one of said mains.

3. The combination of single-phase mains, an induction-machine with a primary winding connected across said mains, a teaser-winding with one end connected to an intermediate point in the primary winding and the other end to the teaser-wire, and a condenser connected between the teaser-wire and one of the single-phase mains.

4. A phase-transforming device consisting of an induction-machine having a main winding, a teaser-winding, and a condenser connected between one terminal of the main winding and one terminal of the teaser-winding.

5. The combination of conductors upon which single-phase electromotive forces are maintained, an induction-machine supplied by said mains and operating to produce an out-of-phase electromotive force, and means for compensating for the lagging current flowing in windings of said machine.

6. The combination with single-phase mains, of a rotary phase-changing device connected thereto, and means for compensating for the lagging magnetizing-current taken by said device.

7. The combination with single-phase mains, of a phase-changing device connected thereto and a condenser for compensating for the lagging current supplied to said device.

8. The combination with single-phase mains, of a rotary, phase-changing device, an additional conductor upon which an electromotive force of displaced phase is maintained by said phase-changing device, and means for starting the phase-changing device and compensating for the lagging current supplied to it when running.

In witness whereof I have hereunto set my hand this 26th day of September, 1899.

CHARLES P. STEINMETZ.

Witnesses:
BENJAMIN B. HULL,
MABEL E. JACOBSON.